United States Patent [19]
Foster et al.

[11] 3,927,044
[45] Dec. 16, 1975

[54] ALKALINE STABLE FUGITIVE TINTS

[75] Inventors: Larry R. Foster; Hans H. Kuhn, both of Spartanburg, S.C.

[73] Assignee: Deering Milliken Research Corporation, Spartanburg, S.C.

[22] Filed: Mar. 19, 1973

[21] Appl. No.: 342,485

Related U.S. Application Data

[63] Continuation-in-part of Ser. No. 47,573, June 18, 1970, abandoned.

[52] U.S. Cl. .................................. 260/394; 252/117
[51] Int. Cl.² ............................................ C09B 11/10
[58] Field of Search ..................................... 260/394

[56] References Cited
UNITED STATES PATENTS

| | | |
|---|---|---|
| 472,091 | 4/1892 | Weinberg .......................... 260/394 |
| 519,971 | 5/1894 | Schmid et al. ...................... 260/394 |
| 1,470,554 | 10/1923 | Craver ............................... 260/394 |
| 2,486,562 | 11/1949 | Iamarino ............................ 260/394 |

*Primary Examiner*—Paul F. Shaver
*Attorney, Agent, or Firm*—Arthur L. Urban; H. William Petry

[57] ABSTRACT

Alkaline stable fugitive tints are disclosed. The fugitive tints are prepared with highly ethoxylated aromatic amines. Tints prepared in this manner exhibit excellent fugitivity and light-fastness, and they are alkaline stable.

9 Claims, No Drawings

ALKALINE STABLE FUGITIVE TINTS

BACKGROUND OF THE INVENTION

This application is a continuation-in-part of Ser. No. 47,573, filed June 18, 1970, now abandoned.

This invention relates to fugitive tints, and more particularly, to fugitive tints of the triphenylmethane type.

In order to identify synthetic and natural fibers during spinning and weaving operations, the fibers often are marked with tints which can be easily removed during some subsequent operation. Ideally, a fugitive tint should have fugitivity from a wide variety of textile fibers after exposure to any condition used in textile production or finishing operations. The fugitive tints also should have color stability to reduce fading and when the tints are subjected to heat and light which may occur while the tinted fibers are awaiting further processing.

Fugitive tints are also desirable in other applications such as in the coloration of soaps and detergents. In these instances, it is desirable to color the soap or detergent with a tint which will not be permanently affixed to the substance that is washed with the soap or detergent. Tints which are intended for use with soaps or detergents must be alkaline stable in addition to being fugitive since soaps and detergents generally are highly alkaline.

SUMMARY OF THE INVENTION

These and other problems associated with the tinting of natural and synthetic fibers as well as soaps and detergents have been overcome by preparing fugitive tint compounds of the triphenylmethane type. An essential feature of these fugitive tints is that the aromatic amine used in the preparation of the tint be ethoxylated to a sufficient degree to render the ultimate compound fugitive. The tints of this invention in addition to being fugitive, exhibit deep and bright coloration and alkaline stability. The alkaline stability results from the use of aromatic aldehydes containing an electron withdrawing substituent in the ortho position.

DESCRIPTION OF THE PREFERRED EMBODIMENTS

The novel fugitive tints of this invention are compounds having the general formula wherein
  R is an alkyl or aryl radical containing up to 10 carbon atoms or
  $H(OCH_2CH_2)_n-$
  X is an electron withdrawing group
  Z is the anion moiety of an acid
  $R_1$ and $R_2$ are H-, halogen, alkyl or alkoxy radicals having up to 10 carbon atoms, and
  $n$ is an integer between about 10 and 100.

Compounds corresponding to the general formula shown above but wherein n is an integer of less than 10 are not fugitive. The X substituent is desirable in the tints of the invention since it is the presence of this group which renders the tints alkaline stable. In this application, a tint is alkaline stable if it is capable of retaining its color in an alkaline solution such as in a solution of sodium hydroxide at a pH of 11. Ordinary triarylmethane dyes are colorless in alkaline solutions.

Triarylmethane dyes and tints generally are formed by a procedure involving the following stages: (a) the formation of a colorless leuco base; (b) conversion of the leuco base to a colorless carbinol; and (c) the formation of the dye or tint by treatment with an acid. One method of preparing the tints of the invention corresponding to the formula given above involves the reaction of two moles of the di-substituted aniline with one mole of the required ortho-substituted benzaldehyde. This reaction is acid catalyzed and results in the formation of the leuco base which is then oxidized to form the carbinol base. Examples of acid catalysts useful in the first stage include concentrated aqueous hydrochloric or sulfuric acid, zinc chloride and hydrochloric acid, etc. Examples of oxidizing agents include lead dioxide, chromic acid anhydride ($Cr O_3$), sodium dichromate and an acid (such as hydrochloric or sulfuric), manganese dioxide, potassium permanganate and hydrogen peroxide. It has been found that the N-polyethyleneoxy substituted aromatic amines are unusually stable to the oxidizing agents and little or no degradation of the side chain occurs during the preparation of the tint. The final step in the preparation of the tint is a treatment of the carbinol base with acid such as hydrochloric acid or sulfuric acid resulting in the formation of an acid salt. The above reactions may be summarized as shown in the following series of reactions:

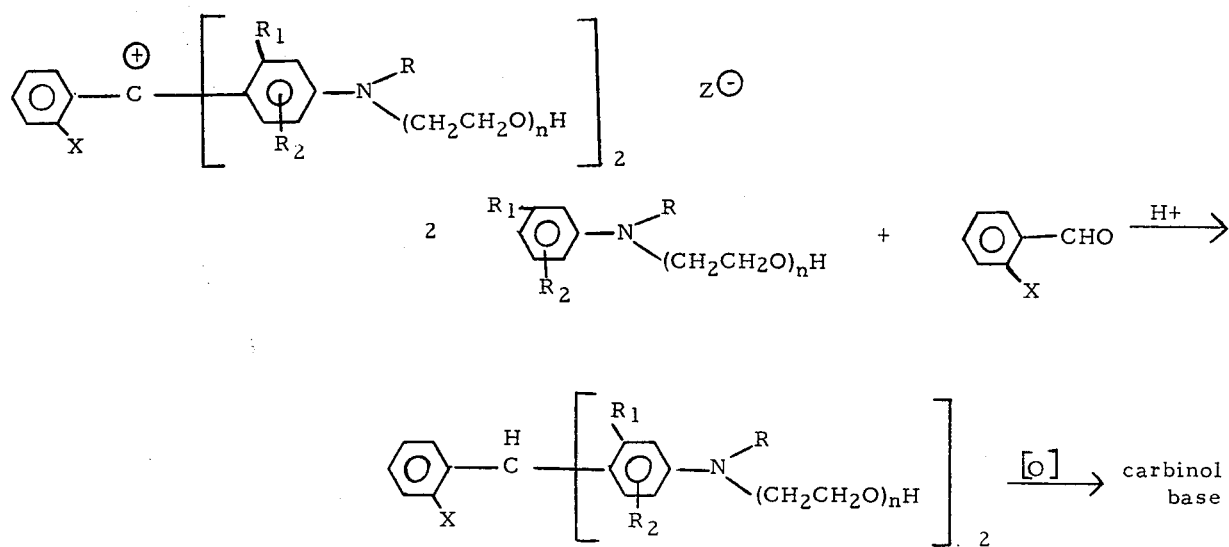

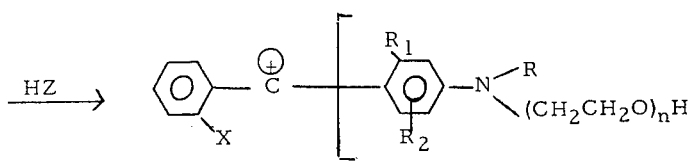

Other methods are known for preparing dyes and tints having the triarylmethane configuration. For example, the central carbon atom can be derived from the carbon atom of a diaryl ketone having tertiary nitrogens in the para position. Such p,p' di-substituted diaryl ketones can be prepared from tertiary aryl amines with phosgene and subsequently condensed with another aromatic compound in the presence of condensing agents such as zinc chloride or phosphorus oxychloride. The dye or tint is produced directly by this method, and no oxidation step is required. This general procedure is widely used commercially.

The polyethyleneoxy substituted aromatic amines useful in the preparation of the fugitive tints of the invention can be prepared by a number of well-known methods. It is preferred, however, that the polyethyleneoxy groups be introduced into the aromatic amine molecule by reaction of the aromatic amine with ethylene oxide. Generally the reaction proceeds in two steps, the first being the formation of the corresponding N,N-dihydroxyethyl substituted aromatic amine. No catalyst is utilized in this first step. The dihydroxyethyl substituted aromatic amine is then reacted with additional ethylene oxide in the presence of a catalyst such as sodium. The amount of ethylene oxide added to the reaction mixture determines the number of ethyleneoxy groups which ultimately attach to the nitrogen atom. Examples of aromatic amines which can be reacted with ethylene oxide in this manner include a-naphthyl amine, aniline, m-anisidine, m-toluidine, 2,5-dimethyoxy aniline, N-methyl aniline, N-ethyl aniline, diphenyl amine and o-chloroaniline. In the preparation of the alkaline stable fugitive tints of this invention, at least ten ethyleneoxy groups should be attached to each nitrogen atom of the aromatic amine.

The aromatic aldehydes which are reacted with the polyethyleneoxy substituted aromatic amines in the preparation of the tints of this invention are ortho-substituted aldehydes, wherein the ortho substituent is an electron withdrawing group. Examples of such electron withdrawing groups include halogens, nitro, sulfonyl, etc. The aromatic aldehydes having a sulfonic acid radical in the ortho position are preferred since these aldehydes result in the formation of tints having exceptional alkaline stability. The utility of aromatic aldehydes having other substituents is contemplated as being within the scope of this invention. For example, benzaldehyde-2, 4-disulfonic acid is useful in preparing alkaline stable fugitive tints.

In general, the aromatic aldehydes reacted with the aromatic amines will have the general formula

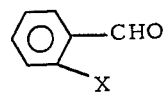

wherein X is an electron withdrawing group of the type described above. The aromatic aldehyde also may contain other substituents such as hydrogen, alkyl, alkoxy, nitro, amino, sulfonyl, halogen, phosphoryl, and the like.

The following examples illustrate the methods of preparing the hydroxyethyl and polyethyleneoxy substituted aromatic amines useful in the preparation of the tints of this invention. Unless otherwise indicated, all parts and percentages are by weight.

EXAMPLE A

Dihydroxyethyl aniline is prepared by bubbling ethylene oxide into aniline under nitrogen until 2 molar equivalents of ethylene oxide have been absorbed.

Similarly, other dihydroxyethyl amines utilized in this invention may be prepared from the corresponding amines and ethylene oxides. Examples of such amines include meta-toluidine, m-anisidine, N-methyl aniline, and 2,5-dimethoxy aniline.

EXAMPLE B

N, N-di(hydroxyethyl)-m-toluidine (102.2 parts, 0.523 mole) is placed in a flask equipped with a stirrer and thermometer in an atmosphere of nitrogen. The material is heated to about 140°C. whereupon 0.2 parts of sodium is added as a catalyst. Ethylene oxide is bubbled into the stirred, molten material at a rate such that a slight amount of the gas escapes from the outlet. The ethylene oxide addition is continued at this temperature until the reaction mixture has increased in weight to about 2,405 parts to provide a pickup of about 100 molar equivalents of ethylene oxide. This compound has a melting point of about 50°C.

EXAMPLE C

N, N-di-(hydroxyethyl)-aniline (182 parts, 1 mole) is placed in a flask equipped with stirrer and thermometer. This material is heated to a temperature of about 140°C. and maintained in an atmosphere of nitrogen. Sodium (about 0.2 parts) is added as a catalyst and ethylene oxide is bubbled into the vigorously stirred liquid. The ethylene oxide addition is continued, with cooling to maintain the temperature between about 140°–160°C. until approximately 98 moles (4,312 parts) of ethylene oxide has reacted. The product obtained in this manner is N, N-di-(polyethyleneoxy)aniline containing a total of about 100 ethyleneoxy units.

EXAMPLE D

The procedure of Example C is repeated except that only 23 moles (1,012 parts) of ethylene oxide is reacted with the N, N-di-(hydroxyethyl)aniline.

EXAMPLE E

The procedure of Example B is repeated except that the toluidine is replaced by an equivalent amount of N,N-di-(hydroxyethyl)-m-chloro aniline, and the reaction is continued for a period of time sufficient to add about 100 molar equivalents of ethylene oxide to the aniline.

EXAMPLE F

The procedure of Example B is repeated except that the toluidine is replaced by an equivalent amount N, N-methyl aniline.

EXAMPLE G

The procedure of Example D is repeated except that N,N-di(hydroxyethyl) aniline is replaced by an equivalent amont of diphenylamine.

EXAMPLE H

The procedure of Example B is repeated except that the toluidine is replaced by an equivalent amount of m-anisidine.

The following examples illustrate the preparation of the fugitive tint compounds of this invention. Unless otherwise indicated, all parts and percentages are by weight.

EXAMPLE 1

A mixture of 90 parts of the polyethyleneoxy compound of Example C, 3.10 parts of benzaldehyde-2,4-disulfonic acid sodium salt and 18 parts of concentrated sulfuric acid is refluxed at a temperature of between 130°–150°C. for 4.5 hours. Water (360 parts) is then added in the form of ice, and the mixture is cooled to 0°C. A finely divided slurry of 2.39 parts of lead dioxide is added in one portion to the reaction mixture at 0°C., and the temperature is allowed to rise to room temperature whereupon the mixture is stirred an additional 2 hours, and filtered. The filtrate is neutralized with sodium bicarbonate to form the internal salt.

A tint prepared in this manner has a blue-green color and is alkaline stable. The tint is fugitive to yarns such as cotton, nylon, acetate, wool, orlon, viscose, etc.

EXAMPLE 2

The procedure of Example 1 is repeated except that the aniline derivative is replaced by an equivalent amount of the polyethyleneoxy derivative prepared in Example B. This tint is green and is fugitive.

EXAMPLE 3

A mixture of 90 parts of the polyethyleneoxy toluidine product of Example B, 3.10 parts of benzaldehyde-2,4-disulfonic acid, 1.36 parts of zinc chloride and 10 parts of concentrated hydrochloric acid is heated at a temperature of 120°C. for 4 hours and then cooled to room temperature by the addition of 360 parts of water. Lead dioxide (2.39 parts) is added in powder form and the mixture is stirred for 30 minutes. An additional 2.39 parts of lead dioxide is then added to insure complete oxidation and the mixture is stirred for 30 minutes.

The reaction mixture is neutralized with sodium bicarbonate, filtered and bottled. The tint obtained is green in color and is fugitive.

EXAMPLE 4

A mixture of 99.15 parts of the polyethyleneoxy toluidine product of Example B, 1.40 parts of o-chlorobenzaldehyde, and 4.9 parts of a 37% hydrochloric acid solution is prepared and heated at 100°C. for 20 hours. The reaction mixture is then oxidized with lead dioxide to form a dark green product. This fugitive tint is a deeper green color than that obtained in Example 3.

EXAMPLE 5

A mixture of 4.86 parts of the aniline derivative prepared in Example F, 0.31 parts of benzaldehyde-2,4-disulfonic acid, 0.4 parts of hydrochloric acid and 100 parts of water is heated at 100°C. for 18 hours, oxidized with lead dioxide and filtered. The filtrate is a blue fugitive tint which exhibits good light and alkaline stability.

EXAMPLE 6

A mixture of 99.1 parts of the toluidine derivative prepared in Example B, 2.6 parts of o-benzaldehydesulfonic acid sodium salt and 3.9 parts of hydrochloric acid (37%) is heated for 4 hours at 100°C., oxidized with 2.4 parts of lead dioxide and 371 parts of water, neutralized with sodium bicarbonate and filtered. The filtrate is a bluish-green fugitive tint, having good light and alkaline stability.

EXAMPLE 7

A mixture of 99.1 parts of the aniline derivative compound of Example C, 2.6 parts of o-benzaldehydesulfonic acid sodium salt and 3.9 parts of hydrochloric acid is heated for 4 hours at 100°C., oxidized with 2.4 parts of lead dioxide in 371 parts of water, neutralized with sodium carbonate and filtered. The filtrate is a fugitive tint which is blue in color and exhibits good alkaline stability.

EXAMPLE 8

A blue fugitive tint is prepared as in Example 7 from a mixture of 58.5 parts of the aniline derivative of Example D, 2.6 parts of o-benzaldehydesulfonic acid sodium salt and 3.9 parts of hydrochloric acid (37% solution).

EXAMPLE 9

A mixture of 585 parts of a product obtained from 20 moles of ethylene oxide and 1 mole of aniline, 20 parts of o-benzaldehydesulfonic acid sodium salt, 70 parts of water and 39 parts of hydrochloric acid is heated and the water is removed. The heating is continued for 4 hours whereupon 23.9 parts of lead dioxide is added after reducing the temperature of the reaction mixture from about 150°C. to room temperature. The mixture is stirred an additional 3 hours and filtered.

EXAMPLE 10

A mixture of 48.4 parts of polyethyleneoxy m-chloroaniline (100 moles of ethylene oxide per mole of chloroaniline prepared in accordance with the process of Example C utilizing m-chloroaniline in lieu of aniline), 3.1 parts of benzaldehyde-2, 4-disulfonic acid, 3.9 parts of hydrochloric acid and 100 parts of water is refluxed at 100°C. for 18 hours, oxidized with lead dioxide and filtered. The filtrate is a green fugitive tint having an adsorption in the visible light region at 662 millimicrons.

EXAMPLE 11

A mixture of 63.0 parts of the diphenylamine derivative of Example G, 4.3 parts of o-benzaldehydesulfonic acid sodium salt and 3.9 parts of hydrochloric acid (37% solution) is heated for 4 hours at 100°C., oxidized with 2.4 parts of lead dioxide in 371 parts of water, neutralized with sodium carbonate and filtered. The filtrate is a green fugitive tint which exhibits good alkaline stability.

EXAMPLE 12

The procedure of Example 1 is repeated except that the aniline derivative is replaced by an equivalent amount of the polyethyleneoxy derivative prepared in Example H. The tint is green and fugitive.

EXAMPLE 13

The procedure of Example 1 is repeated except that the benzaldehyde-2,4-disulfonic acid sodium salt is replaced by an equivalent amount of o-nitrobenzaldehyde. The tint is green and fugitive.

The light-fastness of the tints of this invention is determined by applying the tints to various fabrics in an acetone solution and thereafter subjecting the tinted fabrics to xeon light for periods of 1, 2 and 5 hours. The exposed tinted fabrics are then rated for light-fastness. A rating of 5.0 in this test indicates no loss of shade. A rating of 3.0 or better after one hour is considered satisfactory. The following results were obtained with various fabrics treated with three of the tints prepared above.

LIGHT-FASTNESS OF TINTS

| Tint | Sample Fabric Substrate | Rating After 1 hr. | 2 hrs. | 5 hrs. |
|---|---|---|---|---|
| Product of Example 3 | Cotton | 4.5 | 4.0 | 3.0 |
| 6 | Cotton | 5.0 | 4.7 | 2.5 |
| 7 | Cotton | 4.5 | 4.0 | 2.0 |
| Product of Example 3 | Wool | 5.0 | 4.7 | 4.0 |
| 6 | Wool | 5.0 | 4.7 | 2.5 |
| 7 | Wool | 4.5 | 4.0 | 2.0 |
| Product of Example 3 | Nylon | 4.8 | 4.5 | 3.5 |
| 6 | Nylon | 5.0 | 5.0 | 4.5 |
| 7 | Nylon | 3.5 | 3.0 | 2.0 |
| Product of Example 3 | Dacron | 5.0 | 4.5 | 3.0 |
| 6 | Dacron | 5.0 | 5.0 | 4.5 |
| 7 | Dacron | 4.5 | 4.0 | 3.5 |

The tints of the invention also are useful for coloring soaps and detergents. During recent years, the soap industry has emphasized and created a demand for colored soaps and soap additivies. Many of the known dyes and tints cannot be used for coloring soaps since the soaps are alkaline, and the dyes form colorless carbinol bases in such environments. Also, it is desirable for the coloring matter used to be fugitive so that light substrates do not become colored while being washed.

The tints of the invention are ideal soap colorants since they are fugitive and do not lose their tinting ability in alkaline soaps and detergents. For example, it has been found that 0.3% by weight of a 20% aqueous solution of the tint of Example 7 is sufficient to impart a blue color to a basic detergent. The tint is added to an aqueous detergent solution which is then spray dried in the usual manner forming a blue detergent powder. This detergent can be used in the normal manner without any noticeable color on the washed articles. Similar results are obtained with the other tints prepared above.

The tints of this invention are characterized further by their unexpectedly highly increased color intensity. For example, the tints are more intense in color than the corresponding triarylmethane dyes which have no polyethylene oxide groups on the nitrogen atoms than those having 2 monomeric ethyleneoxy groups on each nitrogen atom.

That which is claimed is:

1. An alkaline stable fugitive tint compound having the formula

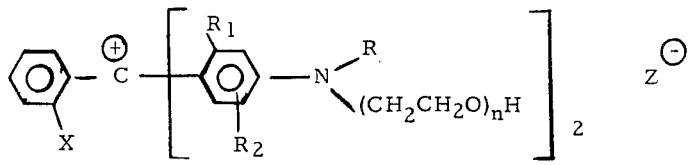

wherein

R is an alkyl or aryl radical containing up to 10 carbon atoms or $H(OCH_2CH_2)_n-$ X is an electron withdrawing group selected from halogen, nitro and sulfonyl radicals Z = anion moiety of an acid $R_1$ and $R_2$ are H-, halogen, alkyl or alkoxy radicals having up to 10 carbon atoms, and $n$ is an integer between about 10 and 100.

2. The compound of claim 1 wherein X is a sulfonyl radical.

3. The compound of claim 1 wherein $n$ is an integer between about 25 to 100.

4. An alkaline stable fugitive tint compound having the formula

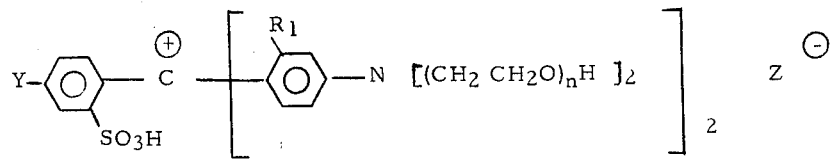

wherein $n$ is an integer between 10 and 100.

$R_1$ is an H—, alkyl or alkoxy radical.

Y is an H— or sulfonyl radical.

Z = the anion moiety of an acid.

5. The product of claim 4 wherein $n = 50$.

6. The product of claim 4 wherein $R_1$ is a methyl radical.

7. The product of claim 4 wherein $R_1$ is a hydrogen radical.

8. The product of claim 4 wherein Y is sulfonyl group.

9. The product of claim 4 wherein Y is hydrogen.

* * * * *

UNITED STATES PATENT OFFICE
CERTIFICATE OF CORRECTION

Patent No. 3,927,044　　　　　　　　　　Dated December 16, 1975

Inventor(s) Larry R. Foster et al.

It is certified that error appears in the above-identified patent and that said Letters Patent are hereby corrected as shown below:

Column 3, line 46, the words "stituted aldehydes." should read --stituted aromatic aldehydes.--

Column 8, line 47, the word "to" should read --and--
Column 10, line 1, the words "is sulfonyl" should read --is a sulfonyl--

Signed and Sealed this fourth Day of May 1976

[SEAL]

Attest:

RUTH C. MASON
Attesting Officer

C. MARSHALL DANN
Commissioner of Patents and Trademarks